US009397747B2

(12) United States Patent
deRuijter

(10) Patent No.: US 9,397,747 B2
(45) Date of Patent: Jul. 19, 2016

(54) METHOD AND APPARATUS FOR CONNECTIVITY CONTROL IN A DATA CENTER NETWORK

(71) Applicant: PLEXXI INC, Nashua, NH (US)

(72) Inventor: Denis H. deRuijter, Harvard, MA (US)

(73) Assignee: PLEXXI INC., Nashua, NH (US)

( * ) Notice: Subject to any disclaimer, the term of this patent is extended or adjusted under 35 U.S.C. 154(b) by 372 days.

(21) Appl. No.: 14/096,497

(22) Filed: Dec. 4, 2013

(65) Prior Publication Data

US 2014/0153924 A1   Jun. 5, 2014

Related U.S. Application Data

(60) Provisional application No. 61/733,154, filed on Dec. 4, 2012.

(51) Int. Cl.
*H04B 10/077* (2013.01)
*H04B 10/275* (2013.01)
*H04L 12/437* (2006.01)

(52) U.S. Cl.
CPC .......... *H04B 10/0773* (2013.01); *H04B 10/275* (2013.01); *H04L 12/437* (2013.01)

(58) Field of Classification Search
None
See application file for complete search history.

(56) References Cited

U.S. PATENT DOCUMENTS

| | | | | |
|---|---|---|---|---|
| 4,759,015 A | * | 7/1988 | Takai | H04L 12/433 370/216 |
| 6,480,473 B1 | * | 11/2002 | Chambers | H04L 12/24 370/253 |
| 6,647,428 B1 | | 11/2003 | Bannai et al. | |
| 7,743,127 B2 | | 6/2010 | Santos et al. | |
| 2002/0052960 A1 | * | 5/2002 | Trisno | H04B 10/2513 709/226 |
| 2002/0064163 A1 | * | 5/2002 | Fujiyama | H04L 12/40182 370/400 |
| 2002/0067700 A1 | * | 6/2002 | Shimadoi | H04L 12/437 370/258 |
| 2003/0227919 A1 | | 12/2003 | Zelig et al. | |
| 2004/0008721 A1 | * | 1/2004 | Ying | H04L 12/437 370/258 |
| 2005/0073955 A1 | | 4/2005 | MacLean et al. | |
| 2007/0140126 A1 | * | 6/2007 | Osswald | H04L 41/06 370/236.2 |
| 2007/0230368 A1 | * | 10/2007 | Shi | H04L 12/42 370/254 |
| 2007/0242682 A1 | * | 10/2007 | Kyusojin | H03M 13/09 370/401 |
| 2008/0170857 A1 | | 7/2008 | Bardalai | |
| 2009/0328133 A1 | | 12/2009 | Strassner et al. | |
| 2010/0014527 A1 | | 1/2010 | Sakauchi et al. | |

(Continued)

FOREIGN PATENT DOCUMENTS

| | | |
|---|---|---|
| EP | 2 429 122 | 3/2012 |
| WO | WO 2009/042919 | 4/2009 |
| WO | WO 2010/133114 | 11/2010 |

OTHER PUBLICATIONS

Sudevalayam, Sujesha et al., "Affinity-aware Modeling of CPU Usage for Provisioning Virtualized Applications," 2011 IEEE 4th International Conference on Cloud Computing, Jul. 4, 2011, pp. 139-146, XP031934583.

(Continued)

*Primary Examiner* — Habte Mered
(74) *Attorney, Agent, or Firm* — Preti Flaherty Beliveau & Pachios LLP

(57) ABSTRACT

A data center network that employs an optical network having optical nodes arranged in a ring topology uses a method of topography discovery and maintenance so that connectivity can be maintained and node failures, link failures, end stations being discovered on the network, etc., can be handled without impacting network performance.

23 Claims, 3 Drawing Sheets

(56) References Cited

U.S. PATENT DOCUMENTS

| | | | |
|---|---|---|---|
| 2010/0165834 A1* | 7/2010 | Holness | H04L 45/28 370/225 |
| 2010/0165883 A1* | 7/2010 | Holness | H04L 45/28 370/255 |
| 2010/0208622 A1 | 8/2010 | Saleh et al. | |
| 2010/0284301 A1 | 11/2010 | Paulitsch et al. | |

OTHER PUBLICATIONS

High Performance Datacenter Networks; Architectures, Algorithms, and Opportunities; Dennis Abts and John Kim; 2011; 115 Pages.

* cited by examiner

METHOD AND APPARATUS FOR CONNECTIVITY CONTROL IN A DATA CENTER NETWORK

RELATED APPLICATION

This application is a non-provisional application claiming priority to U.S. provisional patent application Ser. No. 61/733,154 filed Dec. 4, 2012 and entitled "Method and Apparatus for Connectivity Control in a Data Center Network."

FIELD OF THE INVENTION

The present disclosure relates to data center network architectures and switching technologies and, more specifically, to data center networks that employ optical network topologies and optical nodes.

BACKGROUND OF THE INVENTION

Data center networks incorporate racks of server computers ("servers") to implement application programs ("applications") for supporting their specific operational requirements, including, but not limited to, data base management applications, document and file sharing applications, searching applications, gaming applications, and financial trading applications. Such data center networks are generally expanding in terms of the number of servers incorporated therein, as well as the networking equipment needed to interconnect the servers for accommodating the data transfer requirements of the respective applications.

Conventional data center networks typically have hierarchical architectures, in which top-of-rack switches form the lowest level of the hierarchical network architecture below the next higher level which can include a plurality of Ethernet switches and/or Internet protocol (IP) routers. Each top-of-rack switch in the access layer can be connected to one or more aggregation switches and/or IP routers. The highest level of the hierarchy generally includes a plurality of IP routers (the "core switches") that can be configured to provide ingress/egress points for the data center network. Each aggregation switch and/or IP router can be connected to one or more core switches, which, in turn, can be interconnected to one another. In such conventional data center networks, the interconnections between the racks of servers, the top-of-rack switches, the aggregation switches/IP routers, etc., are typically implemented using point-to-point Ethernet links.

Although conventional data center networks like those described above have been successfully employed, such conventional data center networks have drawbacks. For example, data communications between servers that are not co-located within the same rack may experience excessive delay ("latency") within the data center networks, due to the multitude of switches and/or routers that the data may be required to traverse as it propagates "up," "down," and/or "across" the hierarchical architecture of the networks. Data communications between such servers may also experience latency within the respective switches and/or routers of the data center networks due to excessive node and/or link utilization. Further, because multiple paths may be employed to deliver broadcast and/or multicast data to different destinations within the data center networks, such broadcast and/or multicast data may experience excessive latency skew. Such latency and/or latency skew may be exacerbated as the sizes of the data center networks and/or their loads increase.

To address the foregoing shortcomings, data center networks are provided that employ optical network topologies and optical nodes to efficiently allocate bandwidth within the data center networks, while reducing the physical interconnectivity requirements of the data center networks. Such data center networks provide a hierarchy of control for controlling and provisioning computing resources within the data center networks based at least in part on the network topology and an application component topology, thereby enhancing overall application program performance.

What is needed is a method for administering the optical networks in order to provide consistent and high levels of functionality.

BRIEF SUMMARY OF THE INVENTION

A supervisor census protocol is responsible for maintaining connectivity across a supervisor channel in an optical network. A node on the network can go through several operational stages and its co-resident controller can restart, bog down or hang. These conditions may result in nodes appearing, disappearing or being excluded from active operation as determined and reported by the supervisor census protocol.

In one embodiment, a computer-implemented method of maintaining connectivity of nodes in a network includes receiving, at a first node in the network, a first message directed in a first direction along a supervisor channel from a source node, the first message comprising an ordered list of active nodes and a first field and then determining if the first field is set to a first value or a second value. If the first field is set to the first value then forwarding the first message from the first node in the first direction along the supervisor channel. If the first field is set to the second value then: determining whether the source node immediately precedes the first node in the ordered list of active nodes and if so, forwarding the first message from the first node in the first direction along the supervisor channel, otherwise: sending an update message in a second direction, opposite the first direction, along the supervisor channel to the source node; and modifying the first message by changing the first field to the first value and forwarding, from the first node, the modified first message in the first direction along the supervisor channel, wherein the update message indicates that the ordered list of active nodes is incorrect.

In another embodiment of the present invention, a computer-implemented method of confirming the successful transmission of information from an originating node, in a ring network of nodes, to all other active nodes in the network, includes obtaining a list of the active nodes, and a corresponding topography of the active nodes, in the ring network and then calculating a first check value as a function of the topography of the active nodes from the originating node around the ring network in a first direction and calculating a second check value as a function of the topography of the active nodes from the originating node around the ring network in a second direction. Next, sending, from the originating node, first and second source messages in the first and second directions, respectively and receiving, from a last active node on the ring network, first and second return messages in response to the first and second source messages, respectively. The method then compares a payload in the first return message to the calculated first check value; and a payload in the second return message to the calculated second check value; and then determines that the information was successfully transmitted to all active nodes in the ring network upon determining that the payloads of the first and second return messages each comprises the first and second check values, respectively.

BRIEF DESCRIPTION OF THE SEVERAL VIEWS OF THE DRAWINGS

Other features, functions and aspects of embodiments of the present invention will be more fully understood with reference to the following Detailed Description in conjunction with the drawings in which.

DETAILED DESCRIPTION

The disclosures of U.S. patent application Ser. No. 13/651, 213 filed Oct. 12, 2012 entitled "Data Center Network Architecture," U.S. patent application Ser. No. 13/651,212 filed Oct. 12, 2012 entitled "Affinity Modeling In A Data Center Network," U.S. patent application Ser. No. 13/651,224 filed Oct. 12, 2012 entitled "Control And Provisioning In A Data Center Network With At Least One Central Controller," U.S. patent application Ser. No. 13/651,255 filed Oct. 12, 2012 entitled "Hierarchy of Control In A Data Center Network With At Least One Central Controller," U.S. patent application Ser. No. 13/528,501 filed Jun. 20, 2012 entitled "Optical Architecture And Channel Plan Employing Multi-Fiber Configurations For Data Center Network Switching," U.S. patent application Ser. No. 13/528,211 filed Jun. 20, 2012 entitled "Optical Junction Nodes For Use In Data Center Networks," and U.S. Provisional Patent Application No. 61/554,107 filed Nov. 1, 2011 entitled "Data Center Network Switching," are each incorporated herein by reference in their entirety for all purposes.

U.S. provisional patent application Ser. No. 61/733,154, filed Dec. 4, 2012 and entitled "Method and Apparatus for Connectivity Control in a Data Center Network" is incorporated herein by reference in its entirety for all purposes.

Figure 1:
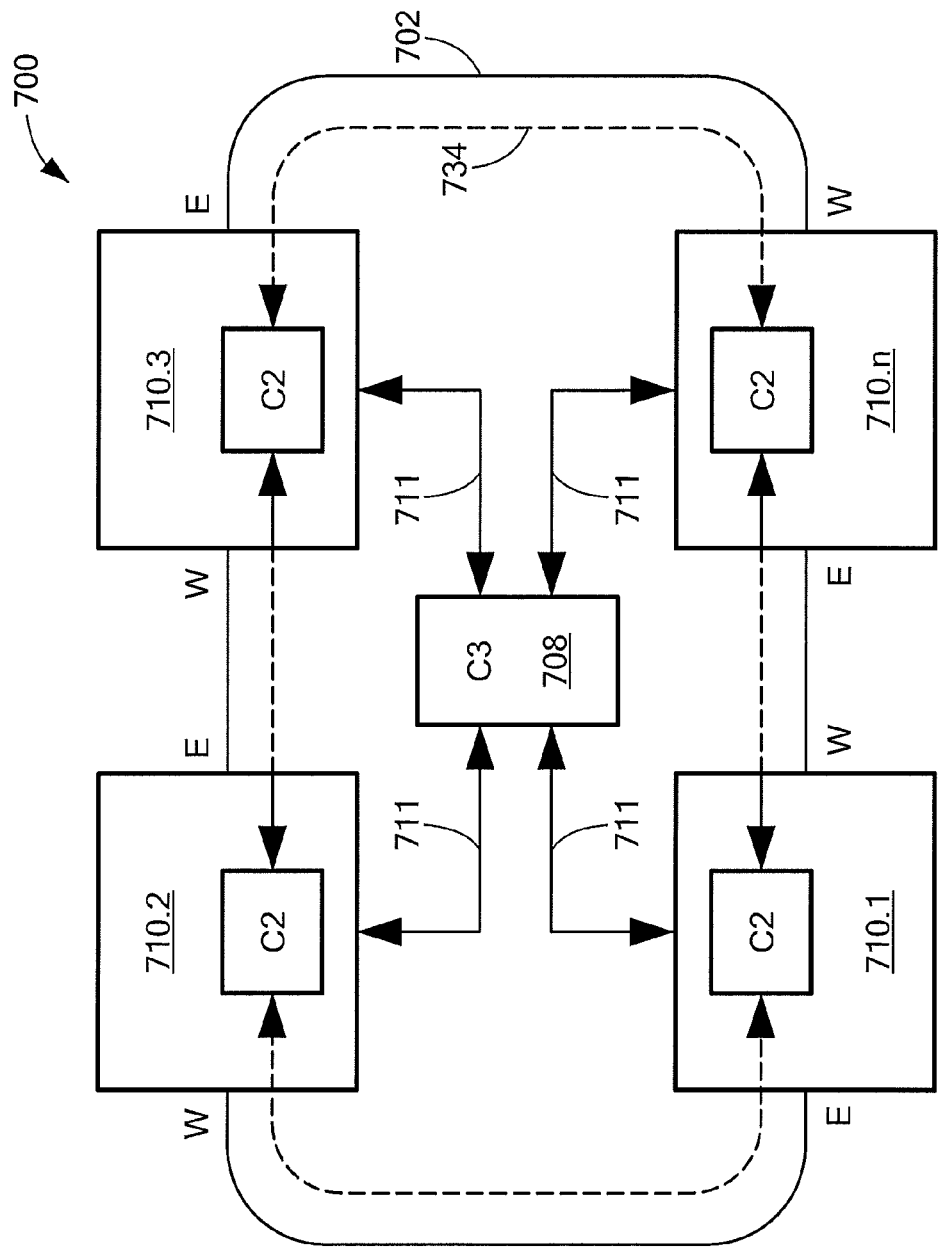
FIG. 1 is a block diagram of a data center network having centralized control of the nodes on the data center network.

For a better understanding of the embodiments of the present invention, a data center network 700, as shown in FIG. 1, including a central controller (C3) 708 that provides centralized control of a plurality of optical nodes 710.1-710.$n$ will first be described. The optical nodes 710.1-710.$n$ are arranged on a logical optical ring network 702. Each of the optical nodes 710.1-710.$n$ includes a co-resident controller (C2) communicably coupled to the central controller (C3) 708. Each of the optical nodes 710.1-710.$n$ can further include a switch, e.g., a packet switch, a packet switch and a cross-point switch, or a packet switch and a cross-bar switch, and a forwarding information base (FIB). Specifically, the co-resident controllers (C2) associated with the optical nodes 710.1-710.$n$ are communicably coupled to the central controller (C3) 708 by controller interfaces 711.1-711.$n$, respectively. Further, each of the optical nodes can employ in-band management through a switch fabric, or out-of-band management.

In addition, each of the co-resident controllers (C2) associated with the respective optical nodes 710.1-710.$n$ is communicably coupled to one or more adjacent co-resident controllers (C2) on the optical ring network 702 by a common control channel, namely, a supervisor channel 734. As a convention, each co-resident controller C2 includes an eastbound port and a westbound port on the supervisor channel 734.

Each of the co-resident controllers (C2) includes a supervisor controller (SC) function. The SC is coupled to the supervisor channel 734.

The co-resident controllers (C2) can employ the supervisor channel 734 to perform at least the following exemplary tasks:

(1) detect incorrect wiring and/or fiber connections, e.g., "east-to-east" instead of "east-to-west");
(2) assist in locating physical wiring and/or fiber breaks;
(3) learn the topology of the optical nodes 710.1-710.$n$ on the optical ring network 702, e.g., the co-resident controllers (C2) can exchange neighbor-to-neighbor connectivity information, allowing the co-resident controllers (C2) to build the topology of the supervisor channel 734, or a partial segment thereof, and, by inference, the topology of the optical nodes 710.1-710.$n$ on the optical ring network 702;
(4) determine the placement of what is referred to herein as a "logical break," e.g., the co-resident controllers (C2) can determine the placement of the logical break, and move the logical break, if necessary—such a logical break is typically adjacent to the last known physical break in the fiber of the optical ring network 702 and will be further defined below;
(5) propagate real-time optical ring network connect and/or disconnect notifications;
(6) learn MAC address/IP address entries, e.g., the co-resident controllers (C2) can learn all of the MAC addresses/IP addresses that represent host computers where the "hosts," are, for example, servers and/or any other suitable network equipment attached to the access ports of the optical nodes 710.1-710.$n$, and announce the MAC addresses/IP addresses to the other co-resident controllers (C2) so that they can determine how each MAC address/IP address can be reached;
(7) remove or update MAC address/IP address entries; and
(8) propagate shared configuration information.

The supervisor census protocol in accordance with an embodiment of the present invention maintains connectivity of the nodes across the supervisor channel 734. As will be described in more detail below, a node on the network can go through several operational stages and its co-resident controller (C2) can restart, bog down or hang. These conditions may result in nodes appearing, disappearing or being excluded from active operation as determined and reported by the supervisor census protocol. The supervisor census protocol also negotiates the placement of the logical break on the supervisor channel and—by inference—the flooding break on the outer rings.

More specifically, the census protocol is concerned with maintaining the "supervisor topography" where the term "topography" is referencing the physical layout of the nodes on the ring rather than any "logical" paths that may be defined for other purposes.

The supervisor topography describes the configuration of the nodes on the supervisor channel ring as follows:

Active list: A sorted list of active nodes in the order they appear on the supervisor ring (or segment thereof) in the eastbound direction where each list entry is a tuple containing:
The station MAC address.
The supervisor channel IP address.
An operational condition or "sub-stage."
The list ends with the node that currently controls the logical break (named the "übervisor") blocking its eastbound port. A node that has been excluded from operating on the ring will not be part of the active list.

Active checksum: A CRC calculated over the active list used as a signature to quickly determine whether two active lists are the same. The checksum is calculated over the entire active list in order but starting at the node that has the lowest station MAC address (resuming the computation with the node at the start of the active list when the end is reached until all nodes have been included).

Black list: An unsorted list of nodes to be excluded from the ring where each entry is a tuple containing:
  The station MAC address of the excluded node.
  The station MAC address of a node calling for the exclusion.
  An enumeration describing the reason for the exclusion.
  It is acceptable and expected that multiple nodes (usually the direct neighbors) are calling for exclusion of the same node but it is desirable that this list remains small (no need for all nodes on the ring to pick on the same target). Nodes calling for exclusion will self-administer and eventually end their embargo so that the excluded node can then try to join the active nodes. In one embodiment, the C3 controller may black list a node and use the null MAC address as the station MAC address of the excluding node so that the C3 controller can recognize and modify the exclusion.
  A node may blacklist itself if, through onboard diagnostics for example, it detects a hardware failure, for example, a failed memory, a transceiver failure or even over heating. A node may be black listed by another node on the ring if an already operational node(s) detects the node is constantly rebooting. The already operational nodes would then place the offending node on the black list.
  Once the offending behavior has been resolved the node may be removed from the black list.

Whole flag: A Boolean indicating the ring is fully connected, i.e., the nodes on the ring are sequentially connected without disruption.

Stable flag: A Boolean indicating the topography has not recently changed.

C3 controller: A list of zero or more synonym IP addresses to reach one (and only one) C3 controller.

Ring ID: A UUID representing the ring or segment thereof (null if unknown).

Confluent rings: An integer (N) representing the number of outer rings shared by logical topology planes—as configured by the C3 controller.

In one embodiment of the present invention, L2 messaging is implemented in order to function independently of any L3 address assignment on the channel.

Next-Hop Multicast Addresses

In one embodiment of the present invention, a predetermined number of "next-hop" multicast MAC addresses, for example, two, are reserved and predefined:
  E1-39-D7-00-00-00 as the "eastbound next-hop multicast address"
  E1-39-D7-00-00-01 as the "westbound next-hop multicast address"

Advantageously, the SC can send a message from its own supervisor port (source address is the station MAC address) to the east or westbound next-hop multicast address and the one receiving neighbor, if any, will respond to the requesting node if the multicast direction matches, i.e., a request with the eastbound multicast address is received on the westbound port of the neighbor and vice versa, and will not otherwise forward the multicast frame further along the supervisor channel. In this way each node can communicate individually with its neighbor(s), either an immediately adjacent node on the supervisor ring or a more distant node, if one or more adjacent nodes are not in active mode.

Logical Break

A logical break is created when an active node transitions to become an übervisor and configures its eastbound port to block all unicast, broadcast and multicast packets with the sole exception of the packets received with the westbound multicast destination address, which will be intercepted by the SC and not forwarded (but only processed when received on the eastbound port). The übervisor enforces the logical break on the supervisor channel to avoid creating a bridge loop when it is fully interconnected. If the supervisor channel is not whole, the easternmost active node on the supervisor ring segment becomes the übervisor and its logical break avoids temporary bridge loops in case all ring segments are joined at the same time. In addition an übervisor performs a beaconing process as described below.

Provided Services

The supervisor census protocol is the lowest level protocol on the supervisor channel 734 and provides the following services to the SC:

Supervisor Topography Service

The supervisor topography (defined above) is conveyed to each node by BEACON messages, described in more detail below, and is stored locally by the SC and made available upon request. The SC also provides a subscription service to help a subscriber identify what topography changes took place by providing the following information:
  An unsorted list of (station MAC, IP address) tuples representing nodes removed with the last change, if any.
  An unsorted list of (station MAC, IP address) tuples representing nodes added with the last change, if any.

Advantageously, implementing the census protocol throttles a rate at which active nodes can be added and, therefore, the logical break will not move in rapid succession so that, as a practical matter, subscribers to topography updates will not be overwhelmed with transients.

L2 Messaging Services

The supervisor census protocol provides reliable and unreliable L2 messaging services for use internally and by other SC subcomponents, for instance, to propagate MAC address attachment information, uplink state change events or transaction processing phases. The maximum payload is set to 9,000 bytes using Ethernet jumbo frames. All messaging services will throw an exception if the payload size was too large if the node is not in active mode.

Broadcast

The supervisor channel forms a separate L2 broadcast domain. An L2 broadcast message is used to convey information to all nodes on the ring but its delivery is considered unreliable. When this messaging primitive is used, recovery due to message loss must be considered as there is no indication whether the broadcast frame actually was transmitted or reached its destinations.

Ejection Eligibility Grant Example

When attachment information for a new MAC address has been distributed to all nodes on the ring, a broadcast can be used to grant ejection eligibility (each node is waiting for permission and will recover if broadcast message is lost).

Multicast

An L2 multicast message is used to convey information to all or some nodes on the ring as per the given multicast destination address but its delivery must be considered unreliable. When this messaging primitive is used, recovery due to message loss must be considered as there is no indication whether the multicast frame actually was transmitted or reached its intended destinations.

Beaconing Example

When the BEACON message is propagated, a multicast message with the next-hop destination address is used to transfer the message to the next active node on the supervisor ring.

Peer-to-Peer

A peer-to-peer L2 unicast message is used for unreliable information transfer between two individual nodes. When this messaging primitive is used, recovery due to message loss must be considered as there is no indication whether the unicast frame actually was transmitted or reached its intended destination.

Ejection Eligibility Grant Example

After ejection eligibility is granted with a broadcast message that was not received by a given node, it will recover by requesting the grant using a peer-to-peer message to the node that owns the MAC address in question.

Hop-by-Hop Relay

A hop-by-hop relay is a sequential transfer of an L2 next-hop multicast message from node to node where the message is eventually returned to the originator to verify that the information made it to all intended destinations. The originator first copies the active list/checksum from the current topography and pre-calculates two CRCs over the station MAC addresses of the nodes to be visited given the current topography in the west and eastbound direction. Next it transmits a copy of the message to the west and then the eastbound neighbors (unless either direction represents an end of ring segment or logical break) and if the hop-by-hop relay reaches the end of the segment or the logical break, the last node returns the message to the originator with a peer-to-peer unicast. If the originator receives the expected number of returns within a "relay retransmission" timeout (1 second) it will verify that the actual nodes visited (recorded inside the message during the hop-by-hop relay when each node calculates the cumulative CRC by adding its own station MAC address) matches the expected nodes by verifying the pre-calculated CRCs and if so, the originator considers the messaging completed without error. If the relay retransmission timeout elapses before the expected returns are received, or if the pre-calculated and recorded CRCs do not match, the message relay is not repeated but a failure indication is returned to the caller.

Each message is only relayed to the next hop after it has been processed and each node can record a processing result in the relayed message that is eventually returned to the originator. When this messaging primitive is used, the processing result is further defined. A completion status provides a failure indication or else the active list/checksum (that were copied by the originator) representing the set of nodes on the ring that were reached. The caller must handle the race condition where the hop-by-hop relay messaging completes after the expiration of the relay retransmission timeout, either by reverting or retrying the intended operation.

MAC Address Attachment Example

When a node learns a new MAC address on an access link it can distribute the information using a hop-by-hop relay, which at the same time resolves concurrent learning conflicts (when the same MAC address is learned by multiple nodes as the result of external bridge loops).

Event Relay

Some events need to be propagated both quickly and reliably. To that end the event relay combines an initial broadcast for instant propagation, followed by a hop-by-hop relay to ensure reliable delivery. The event relay messaging service implicitly combines the broadcast and hop-by-hop messaging services used under the covers and should perform an optimization so that a client does not get notified of both the broadcast and the hop-by-hop event but only of the latter if the former was not received.

Uplink State Example

When an uplink state change occurs, the event needs to be propagated reliably across the supervisor channel so that all nodes can take action to adjust the topology. The event relay can is be used for that purpose.

Transaction Support Example

When a transaction needs to be committed, aborted or rolled back such operations are performed on all nodes at roughly the same time to reduce configuration glitches.

In the data center network 700 each of the optical nodes 710.1-710.n can perform an orderly transition through a plurality of successive operational stages S0-S3.

Operational stage S0 corresponds to an optical node that is powered-off.

Operational stage S1 corresponds to an optical node that is "self-aware," but isolated from the uplinks of the optical node as well as the supervisor channel 734. Such an optical node operating in operational stage S1 does not communicate with co-resident controllers (C2) associated with any other optical nodes, nor does it communicate with the central controller (C3)708.

In operational stage S2, an optical node is not only self-aware, but also "peer-aware." Such an optical node operating in operational stage S2 can communicate with co-resident controllers (C2) associated with other optical nodes over the supervisor channel 734, exchanging network traffic between one or more of the uplink ports and/or the access ports of the respective optical nodes, but does not communicate with the central controller (C3) 708.

In operational stage S3, an optical node can communicate with the co-resident controllers (C2) associated with the other optical nodes over the supervisor channel 734, and with the central controller (C3) 708. The operational stages S1, S2, S3 of an optical node, with respect to the protocol are described in more detail below.

In one embodiment of the present invention, the following census operation modes for a node are defined:
 Reset: The supervisor switch is held in reset and will not forward frames at all, effectively causing a break in the supervisor ring. No software will send or receive frames on the supervisor port. This operation mode is an expected transient at boot time and an active westbound neighbor, if any, will move the logical break to handle the communication disruption on the supervisor ring.
 Early bypass: The supervisor switch is configured to forward all multi-destination (broadcast, multicast and unknown unicast) frames along the supervisor ring, i.e., a frame received east is forwarded westbound and vice versa. No frames will be sent or received on the supervisor port, which remains disabled.

Standby: The supervisor switch is configured to forward multi-destination frames along the supervisor ring and matching unicast, multicast and broadcast frames are received on the supervisor port. The SC processes received frames as necessary but is not allowed to transmit frames. Note that standby mode is not a promiscuous operation in that the SC receives only frames with matching destination addresses.

Transit: The supervisor switch is configured to forward multi-destination frames along the supervisor ring and matching unicast, multicast and broadcast frames are received on the supervisor port with exception of special "next-hop" multicast frames that are received only on the supervisor port and not forwarded along the supervisor ring. The SC processes received frames as necessary and is allowed to transmit frames onto the supervisor channel but only if it can guarantee that there is no bridge loop on the supervisor channel, i.e., a logical break is in place.

Ubervisor: The supervisor switch is configured as in transit mode but the eastbound port will not transmit any frames and all frames received on the eastbound port are blocked with the exception of special "next-hop" multicast frames that are received only on the supervisor port and not forwarded along the supervisor ring. The SC processes received frames as necessary and is allowed to transmit out the westbound port. This mode is used to create a logical break on the supervisor channel.

Excluded: Identical to standby mode but persisting across C2 controller or SC component restarts until such time that the node restarts or explicit permission is received to exit excluded mode.

Figure 2:
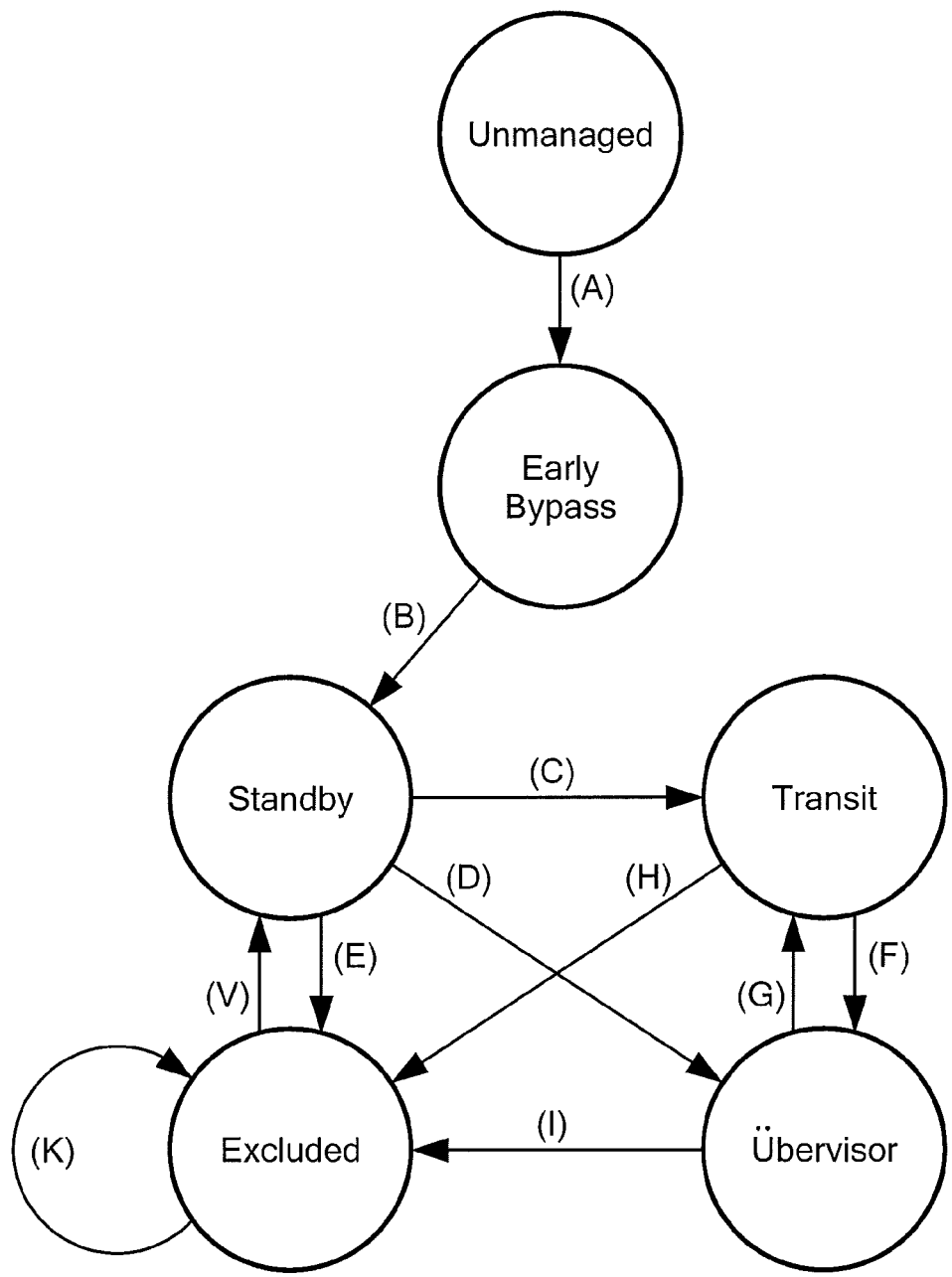
FIG. 2 is a state diagram illustrating a sequence of states that occur during different operational stages of the nodes of the network of FIG. 1.

Reset and early bypass modes are entered in operational stage S1. Transit and übervisor modes are used in either S2 or S3. Standby and excluded modes are used exclusively in stage S2, which implies that any transition to these states causes the co-controller to disconnect from the C3 controller. Nodes in transit or übervisor mode are said to be active nodes and placed in the active list of the supervisor topography while excluded nodes are placed in the black list. Nodes in other modes are not recorded in the supervisor topography, as they cannot communicate their presence on the supervisor channel. Nodes in unmanaged, early bypass, standby or excluded mode are said to be passive nodes. The associated finite state machine for these census operation modes is shown in FIG. 2

When a node is booted or rebooted, there is a brief period where it lingers in reset mode before early bypass mode is configured (transition A). When the C2 Controller (more specifically its SC component) is started, the node will transition from early bypass to standby mode (B) where it stays and observes the supervisor census protocol traffic until it can determine that it can become a transit node (C) or übervisor (D) or is excluded (E). A transit node can become an übervisor (F) when it needs to place a logical break or revert back to transit mode (G) when it removes the logical break.

Any time an active node recuses itself or determines that it has been blacklisted it will transition to excluded mode (H, I) where it remains until the node restarts or has received explicit permission to return to standby mode (J). Note the case where the C2 controller (or just the SC) restarts while in excluded mode (K) when the node must not be permitted to return to standby mode (requiring some non-volatile information to be maintained outside the C2 process space).

Beaconing

Figure 3:
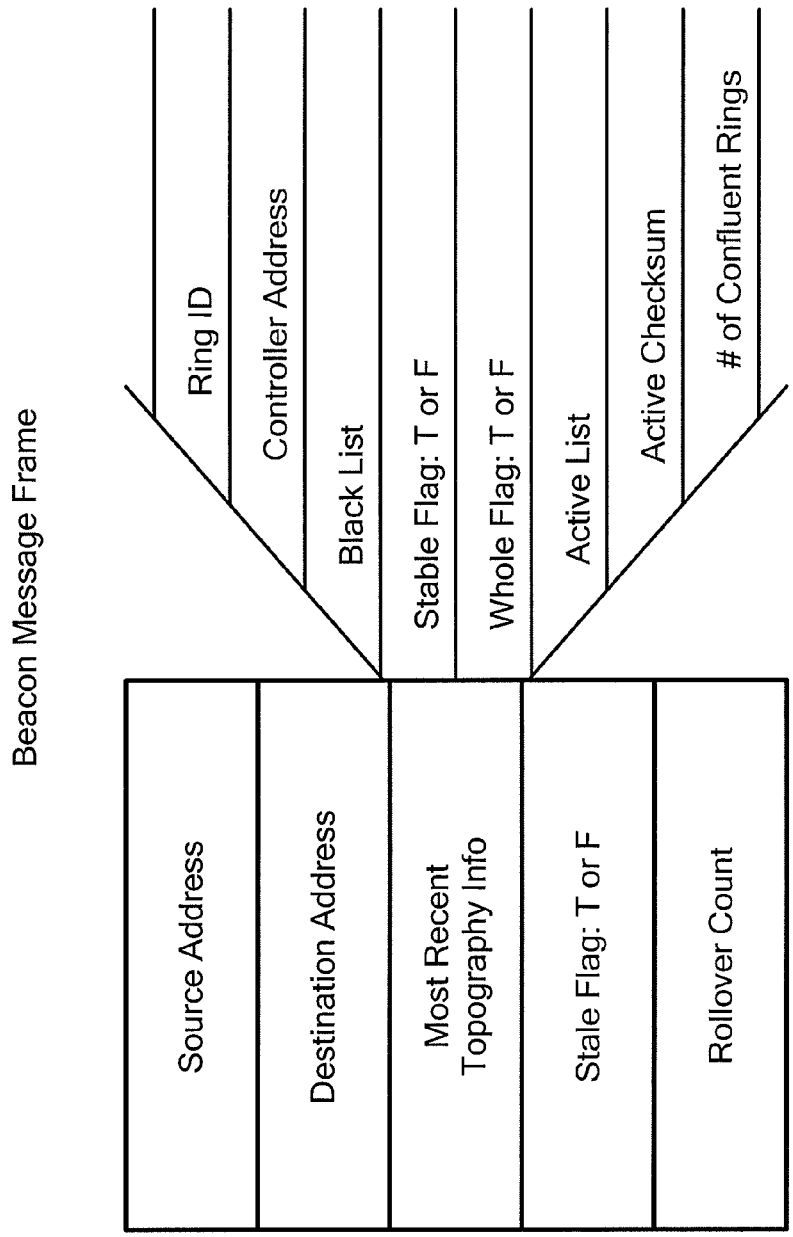
FIG. 3 is a diagram of the fields in a BEACON message.

The übervisor not only places a logical break but also engages in a beaconing process. BEACON messages are used to determine the current supervisor topography and to coordinate node transitions on the supervisor channel. The BEACON message is always sent from the supervisor port in the westbound direction with the station MAC address as the source MAC address and the westbound next-hop multicast address as the destination. A diagram of the fields in a BEACON message is presented in FIG. 3.

Every T1, e.g., 250, milliseconds the übervisor will transmit a BEACON message in the westbound direction that contains the most recent topography (as maintained by the übervisor) and an embedded "stale" flag initialized as false. The next active node on the supervisor channel (or segment thereof) processes the received BEACON message as follows:

If the stale flag is true, it will forward the BEACON message unmodified.

If the stale flag is false, it will verify that the source MAC address of the node that transmitted the BEACON message precedes the receiving node in the active list of the contained topography (active nodes are listed in the eastbound direction). If the embedded topography is incorrect, it will send an UPDATE unicast message with the modified topography back to the originating übervisor and then also forward the BEACON message with the stale flag set to true. If the embedded topography is correct, it forwards the BEACON message unmodified.

Thus the BEACON message either reaches the last node on the ring segment or the originating übervisor itself when the ring is whole, propagating similarly to a hop-by-hop relay (except that the last node does not report back to the originator). In the degenerate case of a single übervisor on the ring (no other active nodes) this will result in a single-node topography.

If the übervisor receives an UPDATE message it will immediately issue a corrected BEACON message. The topography in the BEACON message contains a "stable" flag that is controlled by the übervisor and set to false unless the topography information is considered stable, e.g., defined as three consecutive BEACON messages containing the same topography information while no other übervisor has been detected for the last 5*T1 milliseconds.

The "whole" flag in the topography is set by the übervisor once it receives its own, recently sent BEACON frame as determined by comparing a "rollover" count incremented and embedded by the übervisor in each originated BEACON frame. Any UPDATE message copies the rollover count from the corresponding BEACON message so that the übervisor can ignore stale UPDATE messages. The T1 interval is chosen so that the size of the ring and the processing latency per node permits using only the most recent rollover.

To ensure that an übervisor is reachable by the unicast UPDATE message, and more generally that all active nodes are reachable, and not impeded by any stale MAC address table entries, any active node sends a pre-BEACON message before each BEACON message until the propagated topography is marked as "stable." A pre-BEACON message uses the station MAC address of the transmitting node as the source address, the multicast address E1-39-D7-00-00-02 as destination and has no payload. A pre-BEACON message is sent in both the eastbound and westbound directions unless it is sent by an übervisor in which case it must be sent in the westbound direction only.

Source address learning cannot be disabled by all supervisor switch hardware. A pre-BEACON message will be propagated through the supervisor switch but not received by software in any node and is a cost-effective way to leverage automatic source address learning to correct any stale MAC address table entries, for instance, in nodes that are rebooting or excluded. Note that nodes with stale MAC address table entries do not hamper the propagation of the BEACON message itself as the destination address is the next-hop multicast address but UPDATE and other unicast messages might be discarded, for instance, if a stale entry erroneously points westbound an UPDATE message received on the westbound interface will be dropped.

In summary, the SC uses the BEACON message to:

Determine if an übervisor is present on the segment by monitoring BEACON messages.

Exclude other nodes from the ring by adding them to the black list.

Establish whether this node is excluded from becoming active (which can only be determined once the topography is stable so that nodes further down the segment have been able to contribute to the black list).

Maintain a local copy of the latest topography.

Immediately propagate any changes in the topography— no need to wait for a stable topography—to the C2 Manager component, which in turn will notify the C3 controller if connected.

The BEACON message uses a next-hop multicast destination address because its westbound neighbor may change at any moment, i.e., an adjacent node can transition to active or standby mode, which would cause disruptions if unicast addressing were used and the multicast address conveniently passes the logical break.

The use of the UPDATE message causes immediate propagation of topography changes back to the übervisor on the segment and simplifies overall operation. Alternatives, such as the use of a sole "reflector" node at the western end of a ring segment, require an election mechanism to handle cases where one or more westernmost node(s) are in standby mode and cannot transmit.

Forwarding the BEACON message, even if it is stale, helps to converge on a single übervisor even in the face of stale MAC address table entries that could hinder the delivery of UPDATE messages back to that übervisor. If the system did not propagate stale BEACON frames, the rest of the ring would not receive any BEACON frames and might select a second übervisor.

In case of a supervisor channel segment, i.e., the ring is not whole, the last node in the active list could disappear from the ring without the topography being corrected. This is because the BEACON messaging and the validation of the topography where each node verifies its predecessor is essentially unidirectional. As this issue does not exist in a ring that is whole, it is an acceptable situation.

Selecting One Übervisor

While more than one übervisor can operate on the supervisor channel because each übervisor propagates the BEACON message of the other as if it were a transit node, the intention is for one remaining übervisor to be selected per supervisor ring or segment because multiple logical breaks will disrupt inter-node communication. Note that concurrent übervisors can advertise the same set of nodes but that the active list will be in a different order, however, the active CRC will be the same.

The BEACON message contains a "start of segment" flag that is set by the originating übervisor if and only if one or two of the following conditions are true:

The eastbound port is down. This facilitates the selection of a new übervisor on the west side of a cable break.

No BEACON message was received from any übervisor in the last 4*T1 milliseconds while this node was übervisor itself. In other words, do not become übervisor with the east port up and immediately set the start of segment flag. This facilitates the selection of a new übervisor west of a hung node that absorbs BEACON messages.

When a given übervisor receives a BEACON message from another übervisor it will immediately defer to the other übervisor under either of the following conditions:

The start of segment flag in the BEACON message from the other übervisor is true.

The whole flag is set in both the current topography of the given übervisor and in the embedded topography in the BEACON message from the other übervisor and the station MAC address of the other übervisor is larger then the station MAC address of the given übervisor (applying unsigned arithmetic on the MAC address in canonical representation).

When the given übervisor defers to the other übervisor it will:

Merge its own topography information with the received topography and either send an UPDATE message to the other übervisor (when the merged topography differs from its own) or else forward the received BEACON message westbound.

Enter transit mode using transition G, as shown in FIG. 2.

The selected übervisor propagates the topography of the ring, which includes centrally provisioned information like the list of C3 controller IP addresses, the ring ID and the number of confluent rings. The übervisor propagates that information as retrieved from local storage or received through UPDATE messages (or from any connected C3 controller in operational stage S3). Each node on the ring retains the list of announced synonym C3 controller addresses(s) in local non-volatile storage. The ring ID and number of confluent rings are retained in volatile storage local to the Supervisor Controller and are lost when the latter restarts.

An optical node 710 in operational stage S0 represents a discontinuity in the supervisor channel.

An optical node 710 can enter operational stage S1 when the optical node is first powered-on or rebooted. In operational stage S1, the optical node is transparent to, and isolated from, the links connected to the uplink ports of the optical node, while interconnectivity is provided among the links connected to the access ports. Further, in operational stage S1, one or more self-tests can be performed on the optical node, as desired and/or required, to determine whether or not the optical node is operational. It is noted that, in operational stage S1, an optical node is prohibited from exchanging network traffic with the links connected to its uplink ports, but is allowed to perform bidirectional pass-through with regard to such network traffic, and/or control traffic on the supervisor channel 734.

It is further noted that so-called "bridge loops" in the layer-2 broadcast domain can be avoided when an optical node is operating in its bidirectional pass-through mode by assuring that:

(1) all of the optical nodes on the network are operating in either operational stage S0 or S1, and are therefore prohibited from exchanging network traffic with the links connected to their uplink ports, or (2) at least one of the optical nodes on the network is operating in either operational stage S2 or S3, and therefore may have already established a logical break on a supervisor channel, and/or a flooding break on one or more outer rings of the network, to prevent the creation of such a bridge loop.

For example, an optical node can place such a logical break on the supervisor channel 734 and/or can place such a flooding break on one or more outer rings of the optical ring network 702. Such outer rings generally correspond to a plurality of eastbound uplink ports, e.g., four (4) eastbound uplink ports, or any other suitable number of ports, and a plurality of westbound uplink ports, e.g., four (4) westbound uplink ports, or any other suitable number of ports, of an optical node. It is noted that a logical break can be placed on an optical ring network when it is fully connected, and can be co-located with the last known physical break in the fiber of the optical ring network.

For example, an optical node may place a logical break on the supervisor channel, and/or a flooding break on one or more of the outer rings of an optical ring network, by filtering network traffic in both directions on the eastbound uplink ports of the optical node. Specifically, when the optical node places the logical break on the supervisor channel, the optical node can filter the network traffic on its eastbound uplink ports to prohibit the propagation of all unicast, broadcast, and multicast data packets or frames except for a specified multicast data packet/frame, referred to herein as the "beacon frame," which can be permitted to traverse the logical break to enable the network to determine whether or not the supervisor channel is faulty.

Moreover, when the optical node places the flooding break on the outer rings, the optical node can filter the network traffic on its eastbound uplink ports to prohibit the flooding of all multi-destination data packets or frames, while permitting unicast data packets/frames having known destinations to traverse the flooding break. Such multi-destination data packets or frames are defined herein as broadcast data packets/frames, multicast data packets/frames, and unicast data packets/frames having unknown destinations. As a result, following the placement of such a flooding break, an optical node can still transmit unicast data packets/frames having known destinations in either direction around an optical ring network, and have the unicast data packets/frames successfully reach their respective destinations.

In operational stage S1, a node will progress through reset mode to early bypass mode so the outer rings and the supervisor channel can transparently carry traffic through the node. This is the normal path from operational stage S0 on a cold boot. The MAC address table of the supervisor switch should remain disabled to avoid retaining learned MAC addresses that might blackhole traffic once the logical break moves (an event that a bypassed node cannot observe). The supervisor port is disabled so that the node will leave the supervisor channel untouched.

An optical node 710 can enter operational stage S2 when its associated co-resident controller (C2) achieves connectivity to the links connected to the optical node's uplink ports. In operational stage S2, the co-resident controller (C2) can communicate with one or more other co-resident controllers (C2) associated with the other optical nodes 710 on the network over the supervisor channel 734 without mixing any control traffic with the data plane.

When an optical node enters operational stage S2 from operational stage S1, the co-resident controller (C2) associated with the optical node can employ the supervisor channel to exchange information with its peer co-resident controllers (C2) to determine:
  (1) the topology of the optical network, or the topology of a partial segment of the optical network, and
  (2) the placement of a break, e.g., a logical break, a flooding break, on the optical network.

The optical node can then exchange network traffic between the links connected to its access ports and uplink ports. It is noted that the co-resident controller (C2) associated with the optical node can avoid creating bridge loops by learning the placement of the break, e.g., a logical break, a flooding break, via the supervisor channel, and filtering network traffic in both directions on the eastbound uplink ports of the optical node, as required.

When an optical node enters operational stage S2 from operational stage S3, e.g., communication between the optical node and the central controller (C3) may have been disrupted, all access ports and uplink ports of the optical node can remain operational. Moreover, in operational stage S2, an optical node can employ the supervisor channel to remain in synchronization with the other optical nodes on the optical network (or a partial segment of the optical network), until:
  (1) the co-resident controller (C2) associated with the optical node is re-started, in which case the optical node reverts to operational stage S1,
  (2) the co-resident controller (C2) is considered to be non-responsive, and is therefore excluded from active participation on the supervisor channel, e.g., adjacent co-resident controllers (C2) may detect this condition, causing the central controller (C3) to regard the optical node as being inoperable; the optical node may eventually be re-started, in which case it will revert from operational stage S2 to operational stage S1, or
  (3) a connection between the optical node and the central controller (C3) is established, causing a transition from operational stage S2 to operational stage S3.

It is noted that changing the placement of a logical break on a physical or logical optical ring network, e.g., in response to a fiber cut, or an optical node powering-off, can cause at least some endpoint addresses learned by the optical nodes to become out-of-date. For example, a MAC address learned on an eastbound port of an optical node may now be reachable through a westbound port of the optical node. In such a case, the co-resident controllers (C2) associated with the optical nodes on the optical ring network can cooperate to remove or re-point the MAC address entries when a logical break is either first placed on the optical ring network or subsequently changed, as conveyed over the supervisor channel.

An optical node operating in operational stage S2 can provide connectivity between the links connected to its access ports and uplink ports via (1) any residual links that were previously configured by the central controller (C3) and are still operational, or (2) the outer rings. Moreover, such an optical node operating in operational stage S2 can recover from failures, for example, by tearing down any such residual links that are deemed to be inoperative, and/or by forwarding network traffic in an alternate direction on the outer rings.

In operational stage S2 a node will either:
  Progress from early bypass mode to standby mode using transition B when the C2 component is first started after a reboot. This is the normal path from operational stage S1 on a cold boot.
  Enter standby mode when the C2 controller or SC component is restarted while in standby, transit or übervisor mode. This is the normal path after a software failure (possibly exiting and re-entering operational stage S2).
  Remain in excluded mode using transition K when the C2 controller or SC component is restarted while in excluded mode. This is the normal path after compounded failures to prevent continuous restarts from affecting the operation.

Handling a Supervisor Break

A BREAK message is broadcast with the station MAC address as the source address and the broadcast address as the destination. No payload is defined. Both nodes on either side of a downed supervisor link (single-node rings are not of interest here) detect the port state change and send a BREAK message as an immediate notification to all active nodes of a disruption in the supervisor channel. The active nodes will clear their MAC address table and the existing übervisor will transition to a transit node (removing the logical break) but only if it is not adjacent to the cable break. This will cause any subsequent unicast traffic to resort to flooding and find its way around the cable break resulting in minimal communication disruption. Note that passive nodes will not listen to the BREAK broadcast and may be left with stale MAC address table entries and that makes the BREAK message an optimization useful only to the normal case of rings with only active nodes. Emitting a pre-BEACON message when a BREAK is received should be avoided because that causes a spike of multicast messages (which on large rings may interfere with the propagation of the BREAK messages itself).

Loss of one or both BREAK messages is not detrimental because the node with the cable break on the eastbound port will immediately become the übervisor (placing a new logical break in case the link down was transient) and start beaconing, which will correct any stale MAC table entries on the ring (including passive nodes)—just more slowly then the BREAK broadcasts. If the node with the eastbound port down is already the übervisor there is no need to emit these BREAK broadcasts.

MAC Address Table Handling

In standby and excluded modes the MAC address table of the supervisor switch will rely on explicit BREAK (described above) and pre-BEACON messages (also described above) to correct stale MAC address table entries in passive and active nodes.

When a node enters standby mode the MAC address table is cleared. When a node enters transit or übervisor mode the first time, the MAC address table is enabled and a default aging time of 30 seconds should be configured.

For simplicity, while in active mode, a node will track the last übervisor that originated a BEACON message and will clear the MAC address table every time the originating übervisor becomes known or changes once known. As described above, an active node will clear the MAC address table when it receives a BREAK broadcast.

Standby Mode

In standby mode the SC waits until one of the following conditions occurs:
1. Reception of a BEACON message with a stable topography representing that another node functions as übervisor and has placed a logical break to prevent a bridge loop on the supervisor channel. This also represents that all nodes on the supervisor channel (or segment thereof) have had a chance to contribute to the black list so that this node can determine whether to transition to excluded mode (I) as described above or to transition to transit mode (C) and process BEACON messages as described earlier.
2. No BEACON message is received for an interval of 3*T1 milliseconds or the eastbound port goes down: Transition to übervisor mode (D) after emitting a BREAK broadcast.

Excluded Mode

In excluded mode the SC waits for reception of BEACON messages (from any übervisor). If the excluded node does not receive any BEACON messages, it must not leave excluded mode to cover the case where an excluded node is located east of the übervisor on the easternmost section on a supervisor channel segment and will thus not receive any BEACON messages. Otherwise if over a 5 second interval, or other predetermined amount of time, after this node receives a stable topography (as embedded in the BEACON message) this node is no longer blacklisted then it will transition to standby mode (J).

Transit Mode

In transit mode the node can immediately transition to excluded mode (H) when it is blacklisted in a topography (whether stable or not) embedded in any BEACON message. If no BEACON message is received for 2*T1 milliseconds or if the eastbound port goes down the node will transition to übervisor mode (F) after emitting a BREAK broadcast.

Ubervisor Mode

In übervisor mode the node can immediately transition to excluded mode (H) when it is blacklisted by a topography (whether stable or not) embedded in any BEACON message. If a BEACON message is received from another übervisor a transition to transit mode (G) can result as described above. If the eastbound port of an existing übervisor goes down, it will not emit a BREAK broadcast but immediately send a BEACON message with the start of segment flag set.

An optical node 710 can enter operational stage S3 once the optical node has successfully established a connection with the central controller (C3) 708. If the optical node were to lose contact with the central controller (C3), then the optical node can revert from operational stage S3 to operational stage S2. It is noted that the address of the central controller (C3) 708 can be propagated through the supervisor channel 734 to allow all of the optical nodes 710 on the optical ring network 702 to connect to the same central controller (C3) 708.

As described above, in the data center network 700 each of the optical nodes 710.1-710.*n* can perform an orderly transition through a plurality of operational stages, namely, operational stage S0, operational stage S1, operational stage S2, and operational stage S3.

In normal operation, all of the optical nodes on a physical or logical optical ring network can eventually enter operational stage S3, establishing connectivity with a central controller (C3), which, in conjunction with co-resident controllers (C2) associated with the respective optical nodes, can configure the various links in the optical ring network for more efficient network traffic flow.

In operational stage S3 a node (which must be in active mode) connects to the C3 controller, which is made known either by local configuration or by the topography embedded in a BEACON message. The C2 controller will independently cycle through all synonym IP addresses when trying to connect to the C3 controller and there is no coordination among C2 controllers which synonym C3 controller address to use. The removal of a given synonym will cause any C2 controller using it to switch to an alternate address, if available.

Once connected, the C2 controller will present a ring ID (null if unknown) and the C3 controller either provisions or validates a non-null ring ID so that the C2 controller will obtain a valid ring ID. From then on the C3 controller can change the list of C3 IP addresses, the ring ID or the number of confluent rings. A node will distribute such changes either by issuing a new BEACON message if it is the übervisor or else by issuing an UPDATE message to the last seen übervisor to get it to issue a corrected BEACON.

Note that the C2 controller must not store any new C3 controller address without first negotiating them over the supervisor channel. This prevents the configuration of a C3 controller address that might take effect later.

When multiple C2 controllers present null ring IDs to the C3 controller as they connect, repeated conflicts in negotiating ring IDs over the supervisor channel could result. This scenario will happen when all nodes on the ring (or segment thereof) have previously learned the C3 address, but are then rebooted and connect to the C3 controller at the same time—now with a null ring ID. This situation is avoided by requiring that when the ring ID is null only the übervisor should connect to the C3 controller.

It is noted that the operations depicted and/or described herein are purely exemplary. Further, the operations can be used in any sequence, as appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities can take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments can also relate to a device or an apparatus for performing such operations. The apparatus can be specially constructed for the required purpose, or can be a general-purpose computer selectively activated or configured by a computer program stored in the computer to perform the function of a particular machine. In particular, various general-purpose machines employing one or more processors coupled to one or more computer readable media can be used with computer programs written in accordance with the teachings disclosed herein, or it may be more convenient to construct a more specialized apparatus to perform the required operations.

Instructions for implementing the network architectures disclosed herein can also be embodied as computer readable code on a computer readable medium. The computer readable medium is any data storage device that can store data, which can thereafter be read by a computer system. Examples of such computer readable media include magnetic and solid state hard drives, read-only memory (ROM), random-access memory (RAM), Blu-ray™ disks, DVDs, CD-ROMs, CD-Rs, CD-RWs, magnetic tapes, and/or any other suitable optical or non-optical data storage device. The computer readable code can be stored in a single location, or stored in a distributed manner in a networked environment.

The foregoing description has been directed to particular illustrative embodiments of this disclosure. It will be apparent, however, that other variations and modifications may be made to the described embodiments, with the attainment of some or all of their associated advantages. Moreover, the procedures, processes, components, and/or modules described herein may be implemented in hardware, software, embodied as a computer-readable medium having program instructions, firmware, or a combination thereof. For example, the functions described herein may be performed by at least one processor executing program instructions out of at least one memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A computer-implemented method of maintaining connectivity of nodes in a network, the method comprising:
  receiving, at a first node in the network, a first message directed in a first direction along a supervisor channel from a source node, the first message comprising an ordered list of active nodes and a first field;
  determining, at the first node, if the first field is set to a first value or a second value;
  if the first field is set to the first value then forwarding the first message from the first node in the first direction along the supervisor channel;
  if the first field is set to the second value then:
    determining, at the first node, whether the source node immediately precedes the first node in the ordered list of active nodes and if so, forwarding the first message from the first node in the first direction along the supervisor channel, otherwise:
      sending, from the first node, an update message in a second direction, opposite the first direction, along the supervisor channel to the source node;
      modifying, at the first node, the first message by changing the first field to the first value and forwarding, from the first node, the modified first message in the first direction along the supervisor channel,
  wherein the update message indicates that the ordered list of active nodes is incorrect.

2. The computer-implemented method of claim 1, wherein the first message further comprises a list of excluded nodes, the method further comprising:
  determining, at the first node, whether the first node is in the list of excluded nodes and, if so, setting an operating mode of the first node in accordance with the exclusion determination.

3. The computer-implemented method of claim 1, wherein the first message further comprises a list of excluded nodes, the method further comprising:
  determining, at the first node, that a second node should be excluded;
  determining, at the first node, whether the second node is in the list of excluded nodes and if not in the list, sending a message in the second direction, from the first node to the source node, indicating that the second node should be excluded.

4. The computer-implemented method of claim 1, wherein the network comprises a plurality of nodes arranged in a ring topology.

5. The computer-implemented method of claim 1, wherein the first message is a multicast message sent in the first direction.

6. The computer-implemented method of claim 5, wherein the first message is a multicast message configured to be directed from each node to a next node.

7. The computer-implemented method of claim 1, wherein the ordered list of active nodes corresponds to a sequence in which the active nodes are arranged along the first direction of the supervisor channel.

8. The computer-implemented method of claim 7, wherein the first message further comprises a check value calculated as a function of information corresponding to the ordered list of active nodes.

9. The computer-implemented method of claim 8, further comprising calculating the check value as a checksum of the MAC address values corresponding to the active nodes in the list and in the order in which the nodes are listed.

10. The computer-implemented method of claim 9, further comprising calculating the checksum by starting at the node with the lowest MAC address value and looping to the start of the active list until all nodes have been included.

11. A computer-implemented method of confirming the successful transmission of information from an originating node, in a ring network of nodes, to all other active nodes in the network, the method comprising:

obtaining a list of the active nodes, and a corresponding topography of the active nodes, in the ring network;

calculating a first check value as a function of the topography of the active nodes from the originating node around the ring network in a first direction and a unique value associated with each of the active nodes; and calculating a second check value as a function of the topography of the active nodes from the originating node around the ring network in a second direction and the unique value associated with each of the active nodes;

sending, from the originating node, first and second source messages in the first and second directions, respectively, wherein the first and second source messages include the information;

receiving, from a last active node on the ring network, first and second return messages in response to the sending of the first and second source messages, respectively;

generating a third check value in a first payload in the first source message as the first source message traverses the network of nodes in the first direction, wherein the third check value is calculated using unique values associated with the active nodes;

generating a fourth check value in a second payload in the second source message as the second source message traverses the network of nodes in the second direction, wherein the fourth check value is calculated using the unique values associated with the active nodes;

comparing the third check value to the calculated first check value;

comparing the fourth check value to the calculated second check value; and determining that the information was successfully transmitted to all active nodes in the network of nodes upon determining that the third and fourth check values of the first and second return messages each correspond to the first and second check values, respectively.

12. The computer-implemented method of claim 11, wherein generating the third check value comprises generating a first checksum and comparing the third check value in the first return message to the calculated first check value comprises:
comparing the first checksum of the first return message to the calculated first check value.

13. The computer-implemented method of claim 11, wherein determining that the information was successfully transmitted further comprises:
measuring a time duration from when the first and second messages were transmitted by the originating node to when the last of the first and second return messages was received at the originating node;
comparing the measured time duration to a predetermined threshold value; and
determining that the information was successfully transmitted to all active nodes in the ring network upon determining that the measured time duration is not greater than the predetermined threshold value.

14. The computer-implemented method of claim 11, wherein the first and second check values are calculated as a function of the MAC address values of the respective active nodes.

15. The computer-implemented method of claim 14, wherein the first and second check values are calculated as a CRC function of the MAC address values of the respective active nodes.

16. The computer-implemented method of claim 11, further comprising:
sending each of the first and second source messages as multicast addressed messages.

17. The computer-implemented method of claim 16, further comprising:
sending each of the first and second source messages as a next-hop multicast addressed message.

18. The computer-implemented method of claim 17, further comprising:
setting a first destination address value of the first source message to a first predetermined value identifying the first source message as a next-hop multicast addressed message sent in the first direction; and
setting a second destination address value of the second source message to a second predetermined value identifying the second source message as a next-hop multicast addressed message sent in the second direction.

19. A computer-implemented method of confirming the successful transmission of information from an originating node to all other active nodes in a ring network including network nodes, the method comprising:
receiving at a first active node in the ring network a first source message forwarded in a first direction from the originating node in the ring network, the received first source message including the information and a first received check value calculated from unique values associated with only other active nodes between the originating node and the first active node as the first source message traverses the ring network in the first direction;
calculating a first check value as a function of the first received check value and a unique value associated with the first active node;
modifying the first source message by substituting the calculated first check value in a payload of the first source message for the first received check value; and
sending the modified first source message in the first direction toward the originating node.

20. The computer-implemented method of claim 19, further comprising:
receiving at a second active node in the ring network a second source message forwarded in a second direction from the originating node in the network, the second source message including the information and a second received check value calculated from unique values associated with all other active nodes between the originating node and the second active node as the second source message traverses the ring network in the second direction;
calculating a second check value as a function of the second received check value and a unique value associated with the second active node;
modifying the second source message by substituting the calculated second check value in a payload of the second source message for the second received check value; and
sending the modified second source message in the second direction toward the originating node.

21. The computer-implemented method of claim 19, further comprising:
at the first active node in the ring network:
comparing a first destination address value in the received first source message to a first predetermined address value corresponding to the first direction; and
if the first destination address value is equal to the first predetermined address value then identifying the received first source message as a next-hop multicast addressed message.

22. The computer-implemented method of claim 19, wherein the first value is calculated as a function of the MAC addresses of the active nodes located on the ring network between the originating node and the first active node and the MAC address value of the first active node.

23. The computer-implemented method of claim 22, wherein the first value is calculated as a CRC function of the MAC address values.

\* \* \* \* \*